United States Patent [19]

Trudeau

[11] Patent Number: 5,290,386
[45] Date of Patent: Mar. 1, 1994

[54] PARALLEL PROCESSOR CONTROL OF COMPOSITE MATERIAL HANDLING

[75] Inventor: Allen E. Trudeau, Ansonia, Conn.

[73] Assignee: United Technologies Corporation, Hartford, Conn.

[21] Appl. No.: 13,850

[22] Filed: Feb. 5, 1993

Related U.S. Application Data

[63] Continuation-in-part of Ser. No. 693,748, Apr. 30, 1991, Pat. No. 5,209,804.

[51] Int. Cl.⁵ .............................................. B32B 31/00
[52] U.S. Cl. ..................... 156/350; 156/351; 156/364; 364/478; 348/86
[58] Field of Search ...................... 156/350, 351, 364; 358/101, 903; 364/478

[56] References Cited

U.S. PATENT DOCUMENTS

| | | | |
|---|---|---|---|
| 3,856,607 | 12/1974 | Faltot et al. | 156/364 |
| 3,884,363 | 5/1975 | Ajlouny | 364/478 |
| 4,285,752 | 8/1981 | Higgins | 156/350 |
| 4,287,459 | 9/1981 | Dahlström | 364/478 |
| 4,321,679 | 3/1982 | Fujie et al. | 364/478 |
| 4,437,114 | 3/1984 | La Russa | 358/101 |
| 4,494,139 | 1/1985 | Shima et al. | 358/101 |
| 4,731,856 | 3/1988 | Lloyd et al. | 358/101 |
| 4,909,869 | 3/1990 | Sakamoto et al. | 358/903 |
| 5,041,907 | 8/1991 | Sager et al. | 364/478 |

Primary Examiner—David A. Simmons
Assistant Examiner—William J. Matney, Jr.
Attorney, Agent, or Firm—Melvin P. Williams; Terrance J. Radke

[57] ABSTRACT

A main controller (55) causes a vision controller (36) to determine the exact location of plies (24) for a composite article in response to images from video cameras (35). The main controller then causes a robot controller (40) to direct a robot (42-46) to pick up the plies and move to a neutral position. The main controller causes the vision controller to determine that the plies were in fact picked up. If so, the main controller causes the robot controller to direct the robot to move the plies to the mold while the vision controller looks for the next ply to be picked up, in overlapped fashion. Failure to properly locate the plies and failure to verify that the plies were picked up causes an automatic retry to locate the plies or verify ply pick up.

3 Claims, 6 Drawing Sheets

PARALLEL PROCESSOR CONTROL OF COMPOSITE MATERIAL HANDLING

CROSS-REFERENCE TO RELATED APPLICATION

This application is a continuation-in-part of U.S. Pat. No. 5,209,804 Ser. No. 07/693,748 filed Apr. 30, 1991, entitled INTEGRATED, AUTOMATED COMPOSITE MATERIAL MANUFACTURING SYSTEM FOR PRE-CURE PROCESSING OF PREIMPREGNATED COMPOSITE MATERIALS.

TECHNICAL FIELD

This invention relates to the utilization of multiple data processors for controlling the handling of plies in the manufacture of composite material articles.

BACKGROUND ART

Composite material typically include a matrix of orientated fibrous material (such as graphite, boron, glass or polyimides) impregnated with an epoxy, polymeric, phenolic or similar resinous organic, material. The strength/weight ratio of composite materials provides a significant advantage over conventional materials in a variety of applications.

One type of composite material manufacturing utilizes composite materials that are formed by impregnating woven fibrous cloth, yarn, or fiber tow with a predetermined amount of organic resin, and staging and drying the organic resin to form a partially cured ("tacky") composite material (prepreg), which is subsequently packaged in protective film. Prepreg composite material in the tacky condition is handled and processed in all the operations comprising the pre-cure fabrication phase. Another composite material manufacturing process utilizes only the orientated fibrous material matrix in the pre-cure fabrication phase. Organic resin is injected into the orientated fibrous material matrix immediately prior to the initiation of the cure fabrication phase. Prepreg and wet resin manufacturing systems or processes each have distinct advantages and disadvantages in the manufacture of composite articles.

Composite articles may be fabricated in either process utilizing a plurality of stacked, fiber plies which vary in size, shape and fiber matrix orientation. The pre-cure fabrication phase in forming composite articles typically involves several independent operations such as cutting of composite material into individual composite plies, each having the requisite shape, stacking or placing the cut composite plies in the mold cavity in accordance with the desired fiber orientation (layup), and forming each stack of composite plies over a mold surface contour to ensure proper compaction (debulking) of stacked composite plies, e.g., without wrinkling, during curing.

Prior art pre-cure fabrication operations are typically highly labor intensive and time consuming (and thus costly), requiring manual handling of the composite material/plies during the operations of the pre-cure fabrication phase. For example, the composite material workpiece or roll generally must be hand-placed into position, cut along guide lines to the desired shape or pattern (configuration), and hand transported to a molding station or cell where the cut composite ply is hand laid or stacked in a mold cavity. Hand pressure is utilized to conform the stacked composite ply to the mold surface contour and to stack successive composite plies in combination with previously stacked plies.

However, automated systems are very expensive, and therefore use thereof must be maximized to justify the cost. Additionally, some automated processes do not work well enough to alleviate the need of operators who may be required to verify automated operation (rather than performing hand operation).

Disclosure of Invention

Objects of the invention include provision of improved automated handling of composite plies in a process of manufacturing articles of composite materials.

According to the present invention, various plies of different shapes are picked up from various locations on trays and deposited in various positions and various orientations on the mold in which the composite article is to be made and cured in a process in which a plurality of data processors control respective automated manufacturing tools, and one processor provides overall control between the manufacturing tools to establish proper interrelationship between the operation thereof. According further to the invention, one of the process segments is performed independently of and in overlap fashion with performance of another one of the process segments thereby overlapping as much processing of one ply with processing of a prior ply as possible.

According further to the invention, one process segment is performed to verify a prior process segment. According to the invention further, additional attempts to successfully perform previously failed segments are automatically accommodated.

The invention is capable of implementation utilizing only apparatus and techniques which are known in the art, in the light of the teachings which follow hereinafter. The invention provides improved automated manufacture of articles from composite materials.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2—a find ply subroutine;
FIG. 3—a vision system control routine;
FIG. 4—a ply pickup subroutine;
FIG. 5—a robot control routine;
FIG. 6—a verify pickup subroutine;
and
  FIG. 7—a ply placement routine.

BEST MODE FOR CARRYING OUT THE INVENTION

Figure 1:
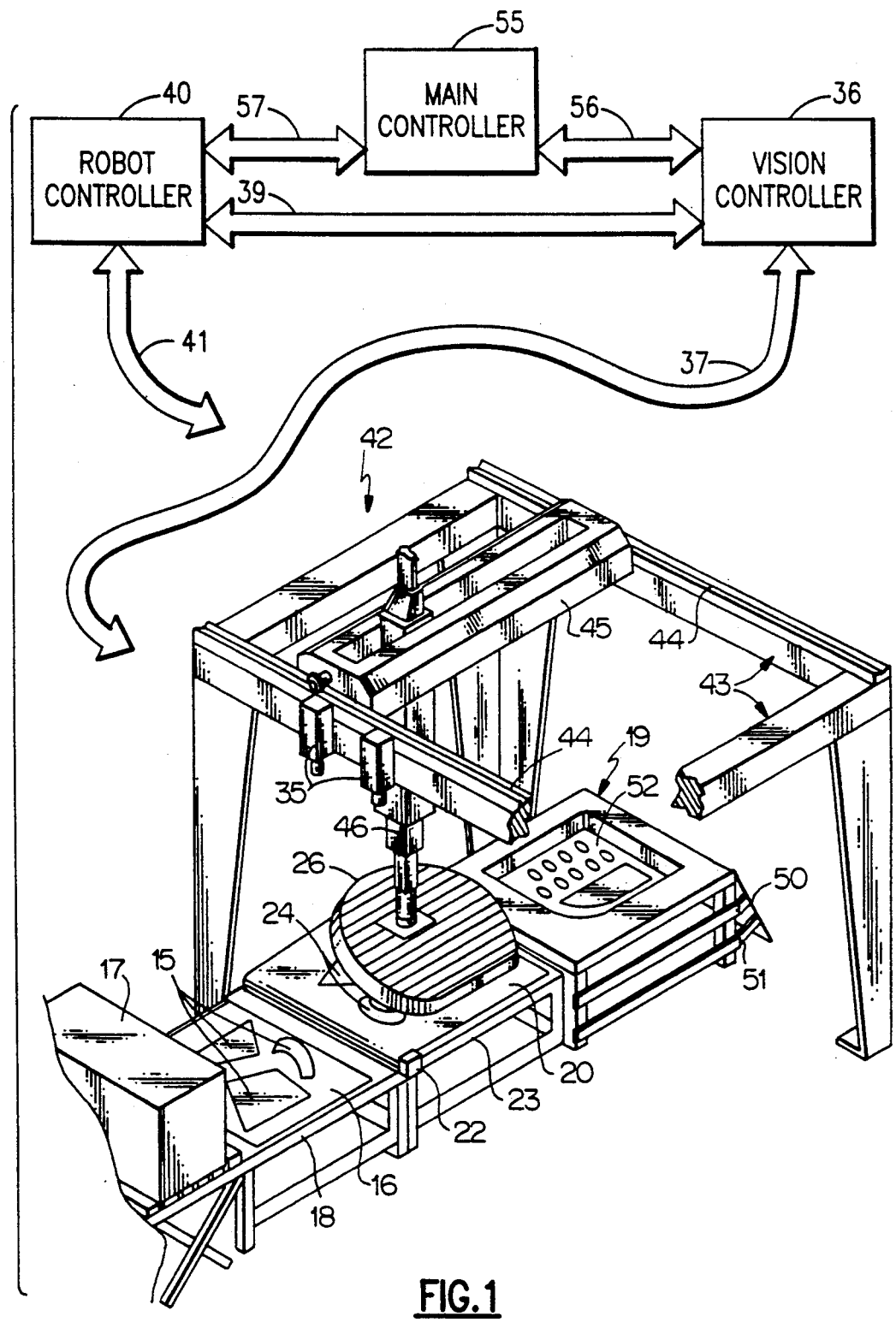
FIG. 1 is a simplified block diagram of controllers in accordance with the present invention and a perspective view of ply inversion, handling and conforming subsystems (of the type disclosed in the parent application) which may be controlled thereby.

In commonly-owned U.S. Pat. No. 5,209,804 entitled INTEGRATED, AUTOMATED COMPOSITE MATERIAL MANUFACTURING SYSTEM FOR PRE-CURE PROCESSING OF PREIMPREGNATED COMPOSITE MATERIALS, an automated composite material manufacturing system is disclosed in an embodiment thereof which handles one-sided prepregs, that is, plies that are preimpregnated on only one major surface thereof. For illustrative purposes, a portion of the system is illustrated in FIG. 1. The plies 15 are provided on a stacking tray 16 which is retrieved from a prepositioning storage/transfer container 17 by a robotic transfer arm (not shown herein) that places the tray on a workpiece support table 18. The plies 15 have been processed thus far with their tacky sides up, but are inverted in preparation of being placed on the ply conforming subsystem 19, for debulking and molding the ply, by means of a vacuum-activated inverter assembly 20 which overlays plies laying on the tray 16 in a position shown by the plies 15, picks them up by vacuum pressure, and then rotates 180° about an automated rotational means, such as a motor driven hinge 22, to a position adjacent an inverter assembly support frame 23 so the plies will be in the position shown by plies 24, where they may be picked up by a ply transfer end effector 26 for placement on the ply conforming subsystem 19. The positions of each of the plies is represented by data resulting from the manner in which the plies were initially cut from a supply of composite material (either prepreg or not, depending upon the operating being performed). However, the plies may move slightly in the handling processes (particularly if the plies are pre-prepared, stored, and then returned at a later date to the molding operation about to be described herein). Therefore, the present embodiment utilizes a machine vision subsystem, including a pair of video cameras 35 (but only one need be used, if desired) interconnected with a vision controller 36 by means of a suitable cable 37 (only partially shown). As described more fully hereinafter, by looking for the plies 24 in the positions where they are expected to be on the ply inverter 20, the vision subsystem can, through image processing of a known type, determine the exact locations of the plies 24. Upon request, the vision subsystem will provide this information over a suitable cable 39 to a robot subsystem that includes a robot controller 40 connected by a suitable cable 41 (only partially shown) to a ply transfer layup subsystem 42, for controlling its movements. This subsystem includes a stationary gantry 43 having spaced apart rails 44, a cross member 45 operative to move along the rails 44, a telescoping arm 46 which is operative to move along the cross member 45 and which supports the ply transfer end effector 26. The end effector 26 itself provides vertical and rotational movement; it also can be moved longitudinally on the cross member 45, and the cross member can be moved laterally on the rails 44; this provides four axes of movement. The end effector 26 may include vacuum actuated transfer feet, such as disclosed in a commonly owned U.S. Pat. No. 5,183,670 entitled "Bi-Functional Transfer Foot". That system is particularly suited to dislodging tacky surfaces from itself, and is therefore best suited in the role of an end effector 26 herein whenever plies are utilized that have been pre-impregnated on both sides, where the end effector will be dealing with tacky surfaces even after the plies are turned over. If only one-sided prepregs or plain plies are to be used in a system incorporating the present invention, then a simpler end effector could be used which does not have mechanical stems and pressure to disengage itself from the tacky surfaces of the plies.

The ply conforming subsystem 19 includes an impervious membrane or bladder 50 which is movable from the position shown to a position over a mold 52, on which the plies are laid up, by means of a frame and four-bar linkage mounting assembly 51. The molding operation performed by the ply conforming subsystem 19 forms no part of the present invention and is not described further herein.

The present invention is concerned with utilizing the information provided by the machine vision subsystem 35, 36 to control the end effector 26 and the robot 40-46 so as to pick up the plies 24 and deposit them on the mold 52, in a manner in which the two controllers 36, 40 are in turn controlled, and caused to properly interrelate, by a main controller 55 connected thereto by suitable cables 56, 57, respectively. The three controllers 36, 40, 55 may comprise personal or desk top computers, or other signal processors, of any suitable type; the robot controller 40, on the other hand, may simply comprise the CNC (computer numeral control) processor normally associated with the robot, if desired.

To begin forming a composite article, it is assumed that all equipment is turned on and that plies 24 are available beneath the end effector 26 in a manner shown in FIG. 1. The invention utilizes routines that are interrelated among the three controllers so as to accommodate four functions: finding a ply, picking the ply up, verifying that the ply has been picked up, and depositing the ply on the mold. In the description herein, the main controller 55 has two routines that run in parallel: one of these routines is broken into the find ply, ply pickup, and verify pickup subroutines; the other routine is the ply placement routine. These four programming segments cooperate with a routine in each of the other controllers 36, 40. To assist in understanding the interdependence of the various routines in the different controllers, alphanumeric keys are employed to indicate the cause and response relationships between the programs. These are, of course, indicative of signals passing between the programs which induce responses.

Figure 2:
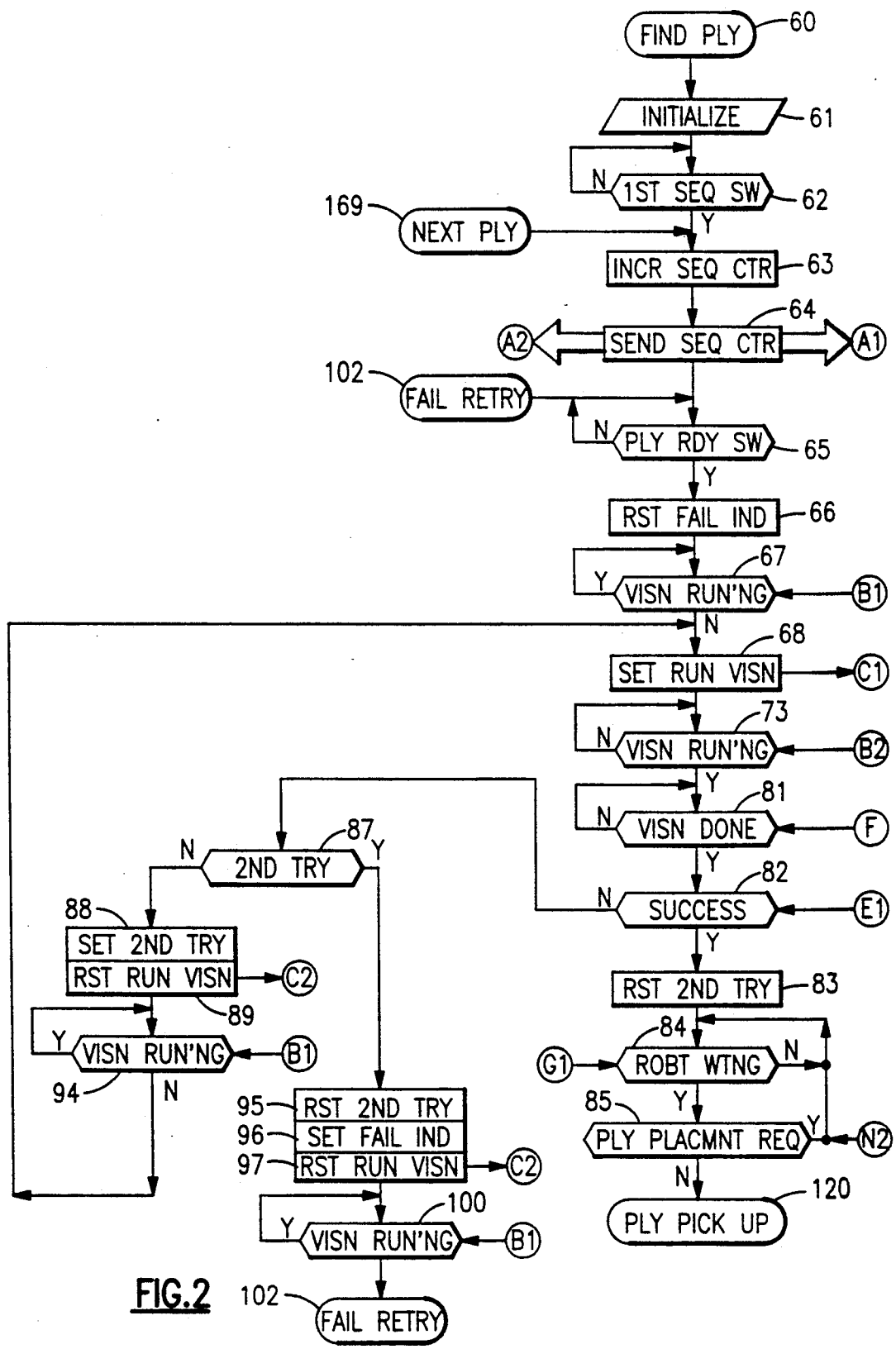
FIGS. 2-7 are logic flow diagrams of routines performed by various processors in accordance with the present invention, as follows.
Figure 3:
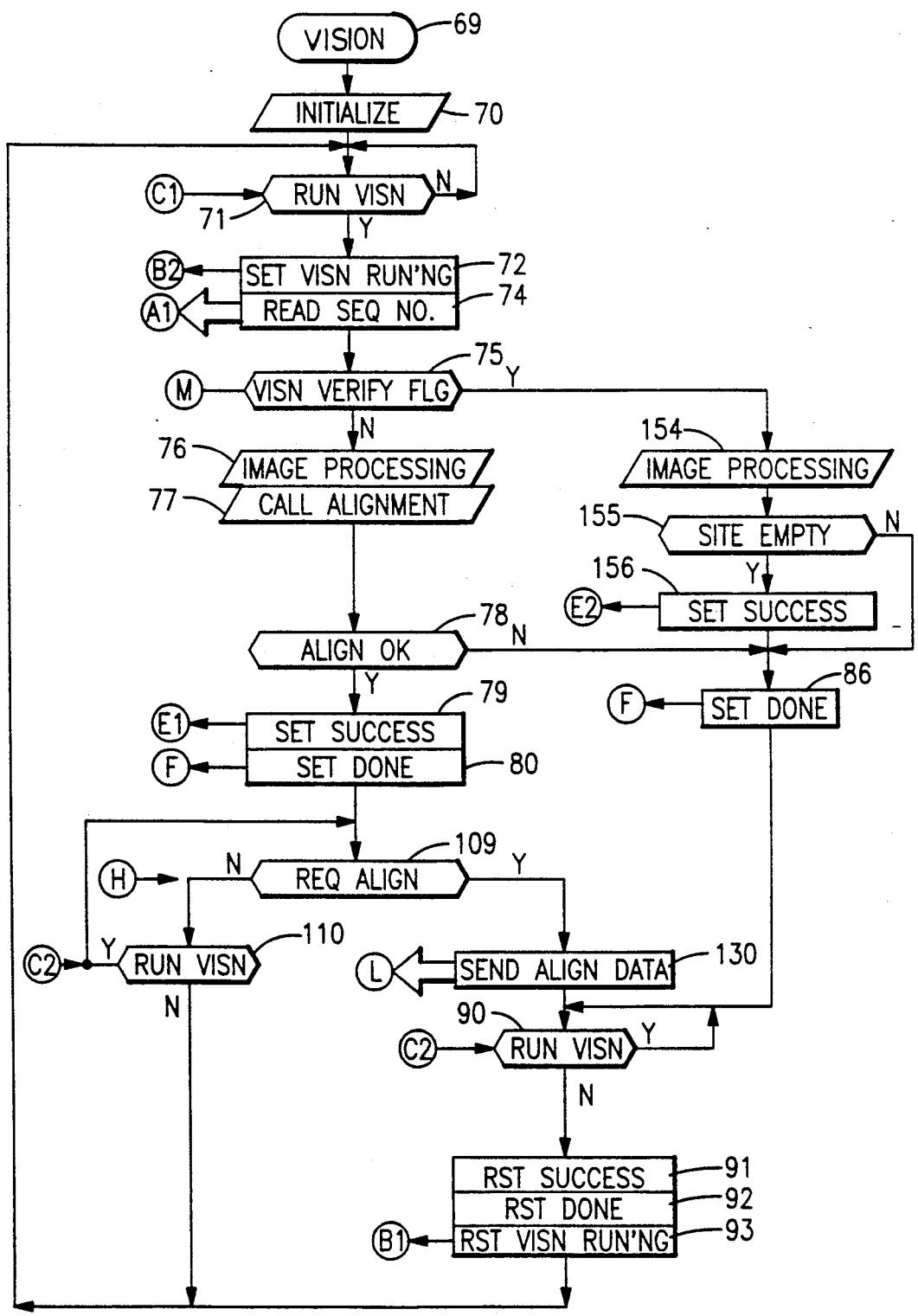

In FIG. 2, the find ply subroutine in the main controller 55 is reached through an entry point 60 which causes an initialize subroutine 61 to be performed. This subroutine provides all the normal initialization functions, and may include establishing the initial states of flags and indicators utilized herein as well as in parts of the program not described herein, all in the well-known way. When initialization has been complete, a test 62 determines if an operator has pressed the switch to initiate operation of the first sequence in a series of sequences to cause an article to be formed in the mold. The controller 55 waits at the test 62 until the operator determines that a molding operation should be initiated. When the operator closes the switch, an affirmative result of the test 62 will reach a step 63 which increments a sequence counter to cause it to point to the sequence about to be performed, there being one sequence related to each ply that must be moved from the inverter assembly 20 to the mold 52 (FIG. 1). Then a step 64 sends that sequence number to both the vision controller 36, key A1 (as described with respect to FIG. 3 hereinafter), and to the robot controller 40, key A2 (as described with respect to FIG. 5 hereinafter). Then a test 65 senses when the operator closes a ply ready switch to indicate that the ply is loaded and that the next ply can be provided to the mold. An affirmative result of test 65 reaches a step 66 which resets a failure indicator (the setting of which is described hereinafter), and then a test 67 determines that the vision controller is quiescent as indicated by the absence of a vision running signal, key B1 (as described with respect to FIG. 3 hereinafter). A negative result of test 67 indicates that the controllers can now cause the vision subsystem to find the ply at its approximate location indicated by its sequence number, within a current image of the cameras 35. Therefore, a negative result of test 67 reaches a step 68 where a run vision command is sent to the vision controller, key C1, as described with respect to FIG. 3. In FIG. 3, the vision controller reaches a vision routine through a transfer point 69, and immediately performs an initialize subroutine 70. A test 71 then waits until the main controller commands the vision program to run, key C1. When it has done so, an affirmative result of test 71 reaches a step 72 wherein the vision system advises the main controller that it is now running (key B2), which causes (FIG. 2) an affirmative result of a test 73, after which the main controller waits for the vision subsystem. Then a step 74 causes the vision system to read the sequence number which was provided to it by the main controller in the step 64 (FIG. 2), key A1. A test 75 determines if the programming for this ply has reached the stage of verifying that the ply has been picked up or not; initially, it has not, so a negative result of test 75 reaches a subroutine 76 in which processing of images provided by the video cameras 35 is performed to determine the actual location of a ply which is in essentially the location established by data relating to the sequence number set in the step 74. This data is the same as the coordinate signals which command the automated cutter to cut the plies from bulk material, as set forth in U.S. Pat. No. 5,183,670. From the data provided by the cameras 35, offsets are calculated in a subroutine 77 so as to provide the capability of aligning the system with the actual position of the ply in the manner described hereinafter. Then, a test 78 determines if the alignment proceeded properly or not. If it has, a step 79 will set a success flag, key E1, and a step 80 will set a done flag, key F, which is detected by the main controller (FIG. 2) in a test 81.

Once the vision process is completed, an affirmative result of the test 81 will reach a test 82 to determine if the process was successful or not, as indicated by the step 79 of FIG. 3.

Assuming that the alignment process proceeded successfully, an affirmative result of the test 82 (FIG. 2) will reach a step 83 which resets a second try flag (described hereinafter). Then a test 84 determines if the robot at rest, is ready to go, as indicated by a robot waiting signal, key G1, described with respect to FIG. 5 hereinafter, and if so, a test 85 determines if a ply placement request is outstanding. This test is part of the parallel processing protocol that allows finding one ply while the next previous ply is being placed on the mold. In the case of the first ply being processed, the ply placement request has been initialized in the off state so that the program can proceed through the test 85; in subsequent passes through the subroutine of FIG. 2, the program will wait at test 85 until the robot has finished placing the ply on the mold.

If cameras 35 (FIG. 1) were not able to pick up the image of the ply within the predetermined tolerance, the subroutine 77 (FIG. 3) would be unable to calculate the offsets to allow perfect alignment with it. Therefore, a negative result of the test 78 would reach a step 86 which would set the done flag, key F, as described hereinbefore. But in this instance, it does so without first setting the success flag. In such a case, the test 82 (FIG. 2) would be negative reaching a test 87 to determine if the second try flag has been set or not. The initialized subroutine 61 originally places this in the reset state, so that a first pass through the test 87 is always negative, reaching a step 88 in which the second try flag is set and a step 89 where the run vision command is reset, key C2. In FIG. 3, this fact is watched for in a test 90 which responds to the step 89 with a negative result, reaching a step 91 which resets the success flag, a step 92 which resets the done flag, and a step 93 which resets the vision running flag, key B1. When the vision running flag is reset in FIG. 3, a test 94 (FIG. 2) determines that fact and a negative result thereof causes the program to revert to the step 68 so that the entire find ply vision process involved in steps and tests 68-85, described hereinbefore, can be repeated. This is one of the features of the present invention: a second try will be made to find the ply, without operator intervention. If the alignment fails a second time, then a negative result of test 78 (FIG. 3) will again cause the done flag to be set in step 86 and an affirmative result of test 81 (FIG. 2) will reach a negative result of test 82 which again reaches the second try test 87. This time, the test will be affirmative reaching a step 95 where the second try flag is reset and the fail indicator is set in a step 96 to advise the operator that a failure has occurred. Then a test 97 resets the run vision command, key C2, and a test 100 determines if the vision controller has responded to the reset of the run vision command by the absence of the vision running signal, key B1; this would occur in FIG. 3 as a consequence of the negative result of test 90 reaching the steps 91-93 which include resetting of vision running. With the vision controller shut down, the program reverts to a quiescent state at the test 65 (FIG. 2) through a fail retry transfer point 102 to await further action by the operator, in the light of the fail indicator having been set at step 96. The operator may, for instance, load a new tray of plies and thereafter initiate the process again.

Assume once again that the ply calculations have been successful. In FIG. 3 after the vision controller has set success and done in the steps 79, 80 it reaches a test 109 where it waits until the robot controller requests alignment data, key H. While it is waiting, successive negative results of test 109 reach a test 110 to determine if the vision controller is still being commanded to run, key C2, by the main controller. This prevents the vision system from hanging up at test 109 if the main controller stops for some reason, or the routines do not proceed for any other reason. In the normal course of events, a loop will be established between a negative result of test 109 and a positive result of test 110. Returning to FIG. 2, assuming that any previous ply has been placed on the mold, there will not be a ply request outstanding so a negative result of the test 85 will reach the ply pick up subroutine of FIG. 4 through a transfer point 120.

Figure 5:
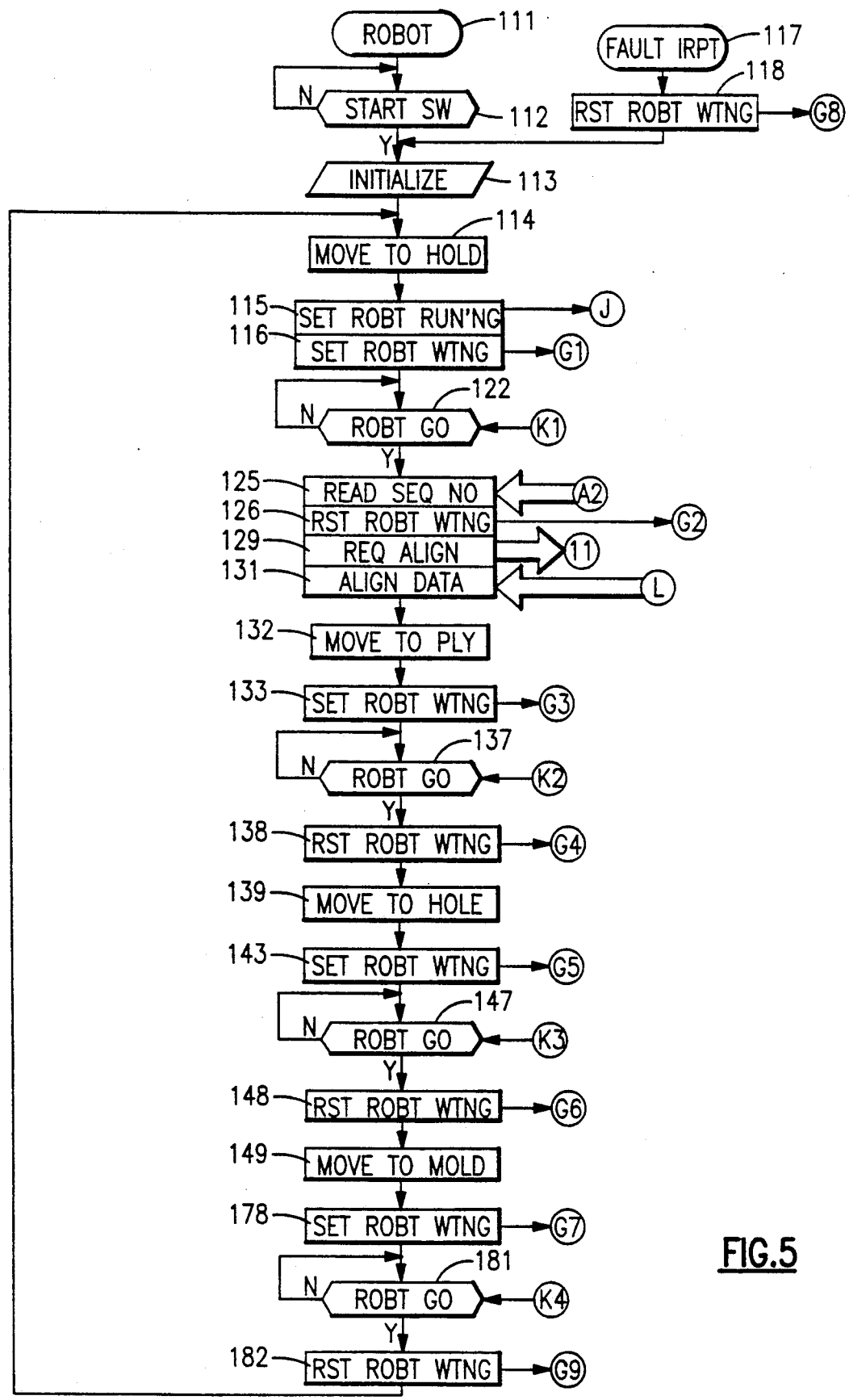

The ply pick up subroutine interfaces with the robot, so the program for the robot controller will be introduced first. In FIG. 5, the robot controller routine is reached through an entry point 111 and hangs up at a test 112, waiting for a start switch to be closed. It is assumed that the operator closes the robot start switch at approximately the same time that the first sequence switch of test 62, FIG. 2, is closed. When the start switch is closed, an affirmative result of test 112 will reach a subroutine 113 which initializes the robot controller in a suitable fashion in accordance with techniques known in the art. Immediately thereafter, the robot is commanded to go to a hold position by a step 114. In a usual case, the robot is probably already at the hold position, having been left there in previous operations. The hold position is a position where the end effector 26 is out of the way of the bladder 50 and not in the path of the cameras 35 as they attempt to view the plies 24. It may therefore be approximately midway along the cross member 45, with the telescoping arm 46 in its fully upward position. The step 114 assures that the robot will not interfere with the vision system generation of alignment signals, as described hereinbefore. Then a step 115 sets a robot running flag, key J, which is reset in the initialize subroutine 113 during startup, or whenever a fault interrupt is established by lack of vision system success in ply pick up verification by steps in the main controller (such as step 164a in FIG. 6, hereinafter). When the robot reaches the hold position, it will cause a step 116 to set the robot waiting flag, key G1, which is the setting that is sensed in test 84 of FIG. 2 that allows the main controller program to advance to the pick up ply subroutine. At this stage, in the usual case, the robot controller waits at a test 122 for a command to go, the main controller may be cycling through affirmative results of both tests 84 and 85 in FIG. 2, and the vision controller is cycling through a negative result of test 109 and an affirmative result of test 110. This condition will also be reached by a fault interrupt through a transfer point 117, which causes resetting of a robot waiting flag at a step 118, as described hereinafter.

Figure 4:
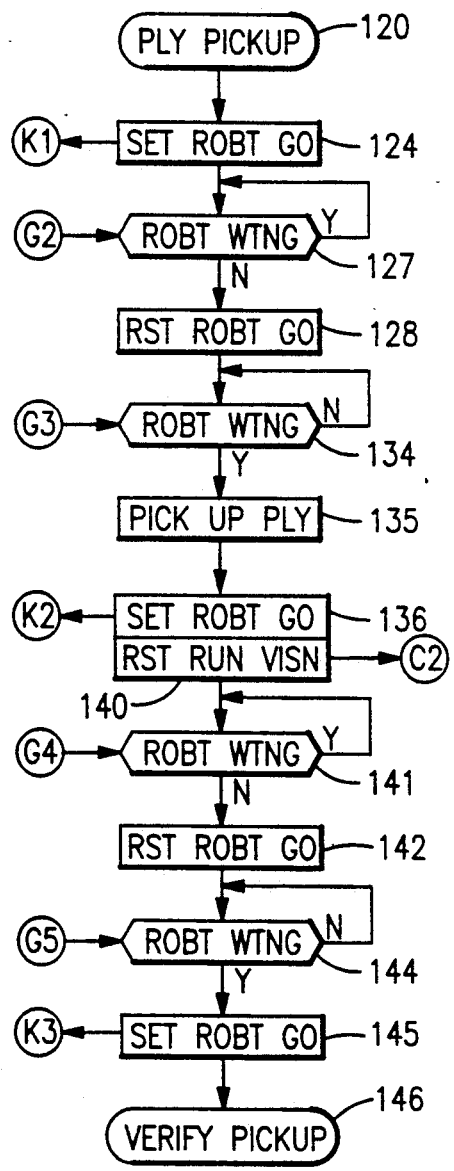

In FIG. 2, when the ply placement request (described hereinafter) is not outstanding, a negative result of test 85 causes the ply pickup subroutine of FIG. 4 to be reached through a transfer point 120. Then a robot go command, key K1, is set in a step 124, causing an affirmative result of test 122 (FIG. 5) to reach a step 125 where the sequence number, key A2, for the current ply is read. This sequence number was previously made available by the main program at the step 64 of FIG. 2. As soon as the robot moves, a step 126 will reset robot waiting, key G2, which causes a test 127 in FIG. 4 to be negative which in turn causes robot go to be reset in a step 128, so that the robot will wait for a fresh command once it gets to its destination and indicates that it is waiting. In the meantime, in the robot controller program of FIG. 5, a step 129 requests alignment data, key H, from the vision subsystem (FIG. 3) which causes an affirmative result of test 109. This in turn causes a step 130 to send the alignment data, key L, to the robot controller which is received and stored in a step 131 (FIG. 5). Then a step 132 commands the robot to move to the position to pick up one of the plies 24, and in the meantime, the vision controller cycles on an affirmative result of the test 90 waiting for the command to run the vision system to disappear. When the robot reaches the position to pick up one of the plies 24, a step 133 sets the robot waiting latch, key G3, which causes an affirmative result of a step 134 (FIG. 4) to reach a step 135 where the end effector 26 is ordered to pick up a ply.

Once ply pick up has occurred, a step 136 (FIG. 4) sets robot go, key K2, which causes an affirmative result of a test 137 (FIG. 5) to reach a step 138 to reset robot waiting, key G4, and a step 139 which tells the robot to move to the hold (or clear) position. In FIG. 4, meanwhile, a step 140 has reset the run vision command, key C2, and then the routine has waited at a test 141 to sense that the robot had responded to the go command, by reset of robot waiting, key G4, which in turn resets robot go at step 142. In FIG. 5, when the robot gets to the hold position, a step 143 will set robot waiting, key G5. The robot will not wait in the hold position, but sensing that it has reached the hold position is an indication to the main controller that it is now clear of the cameras 35 so that the cameras can again view the ply inverter assembly 20 to verify that the correct one of the plies 24 has indeed been picked up. Therefore, immediately upon sensing that the robot has reached the hold position, an affirmative result of the test 144 (FIG. 4), the program of the main controller again sets robot go, key K3, to get the robot headed toward the mold. The main controller then advances to the verify pick up subroutine of FIG. 6 through a transfer point 146.

Figure 6:
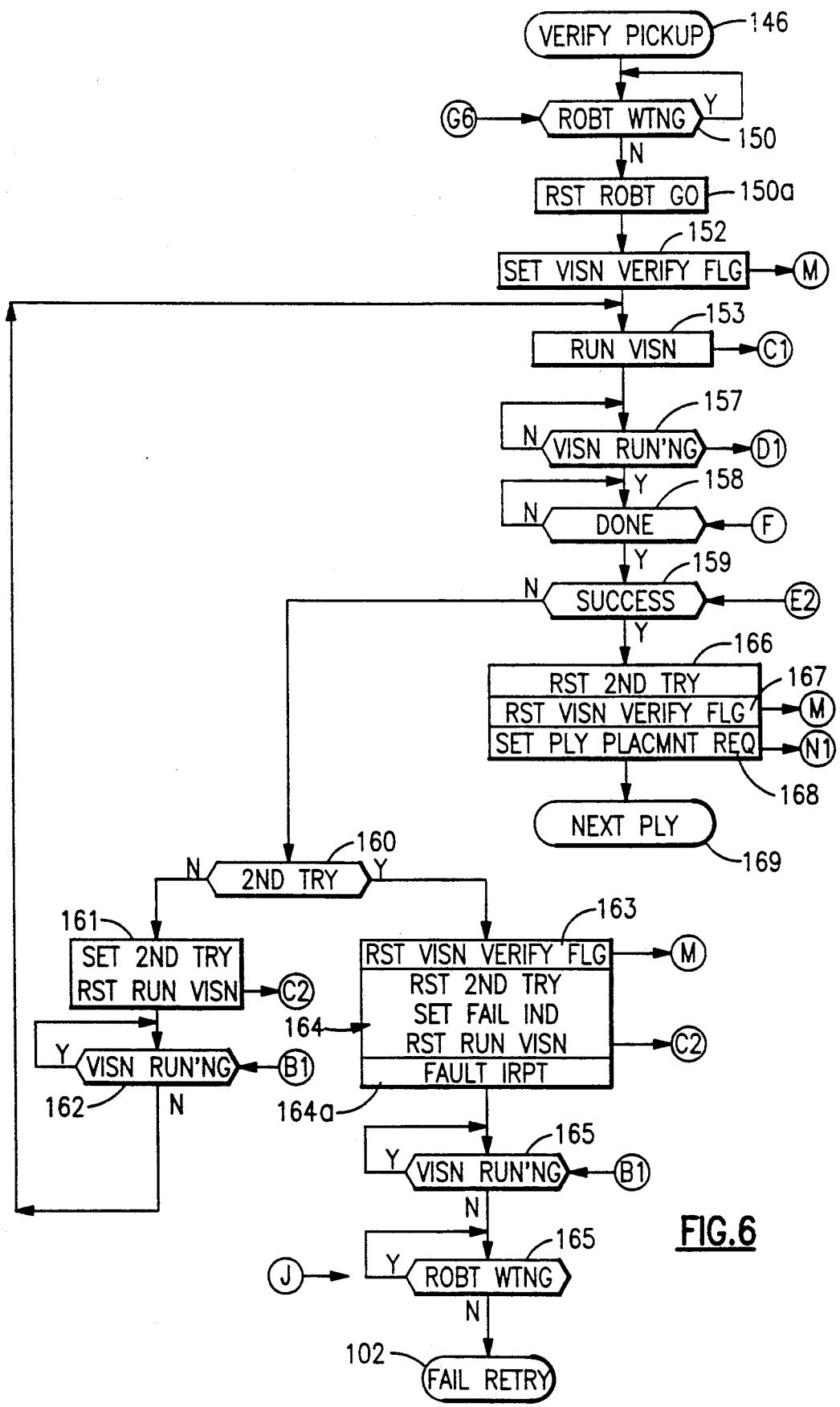

In FIG. 5, the robot controller has received the set robot go command, key K3, so an affirmative result of a test 147 will cause a step 148 to once again reset robot waiting, key G6, and a step 149 which commands the robot to move to the mold. In FIG. 6, the reset of robot waiting causes a negative result of a test 150 to reach a step 150a which once again resets robot go. This indicates to the main controller routine that the robot is headed for the mold and now, in a parallel fashion, it is possible to verify that the ply in fact has been picked up. A step 152 sets the vision verify flag, key M, and a step 153 provides the run vision command, key C1, so that the vision subroutine of FIG. 3 will advance from its waiting state at test 71, set vision running at step 72, reread the sequence number at step 74, and reach test 75 to determine whether this is the ply pick up verification portion of the process or not. In this case, since the step 152 (FIG. 6) has set the vision verify flag, key M, an affirmative result of the test 75 will reach a subroutine 154 which processes the image data from the video cameras 35 in a manner to determine whether or not the ply is now missing from the area indicated by the coordinates corresponding to the current sequence number. In this case, the image processing of the subroutine 154 simply determines that the site is empty or not. If it is empty, an affirmative result of a test 155 will reach a step 156 to set success, key E2, and then reach the step 86 to set done, key F. On the other hand, if the site is not empty, then the step 156 is bypassed.

During this time, as soon as the vision running flag is set by step 72, key B2, this is sensed in FIG. 6 by a test 157 so that the subroutine advances to a test 158 and waits while the image processing is being performed. Once the step 86 (FIG. 3) sets the done flag, key F, an affirmative result of the test 158 reaches a test 159 to determine whether the verification was successful or not. If the verification is not successful, a negative result of the test 159 will reach a test 160, a negative result of which will reach steps 161 and a test 162 to cause a second try of the verification process, without intervention, as described with respect to tests and steps 87-94 in FIG. 2 hereinbefore. If on the second attempt, success in verification is still not had, a negative result of test 159 and an affirmative result of test 160 will reach a step 163 which will reset the vision verify flag, key M, so that the vision system will be utilized for ply pick up rather than verification in the next pass through the subroutine of the vision controller in FIG. 3. Then, a series of steps 164 reset the second try flag, set the fail indicator and reset the run vision command. A step 164a causes a fault interrupt in the robot controller (FIG. 5) to reinitialize the robot for ply pick up, since it appears that it has moved away from the ply pick up area without the ply. In FIG. 5, robot waiting is reset at step 118, and the robot routine is reinitialized and the robot is moved from the mold to the hold position (step 114) and then waits at test 116. In FIG. 6, a pair of tests 165 ensure that the vision system is off and robot waiting has been reset, key G8, by the interrupt passing through step 118 (FIG. 5) to reach the fail retry transfer point 102, as described with respect to tests and steps 95-100 in FIG. 2, hereinbefore. This leaves the system in a quiescent state, waiting at the test 65 (FIG. 2), for the operator to close the ply ready switch as described hereinbefore.

If verification was successful on either the first or second try, an affirmative result of test 159 (FIG. 6) will reach a step 166 that will reset the second try flag to ensure that the second try flag is reset in case success had been achieved on the second try. Then a step 167 will reset the vision verify flag to ensure that pick up, rather than verification, will be achieved by the vision system in a subsequent pass. Next, a step 168 will set a ply placement request, key N1, to indicate to the parallel program of FIG. 7 that ply placement can occur when the robot delivers the ply to the correct position over the mold, as the main program of the main controller reverts to finding the next ply, as a consequence of returning to FIG. 2 through a next ply transfer point 169. This is one of the features of the present invention: the vision system can seek the next ply while the robot system is placing the prior ply.

Figure 7:
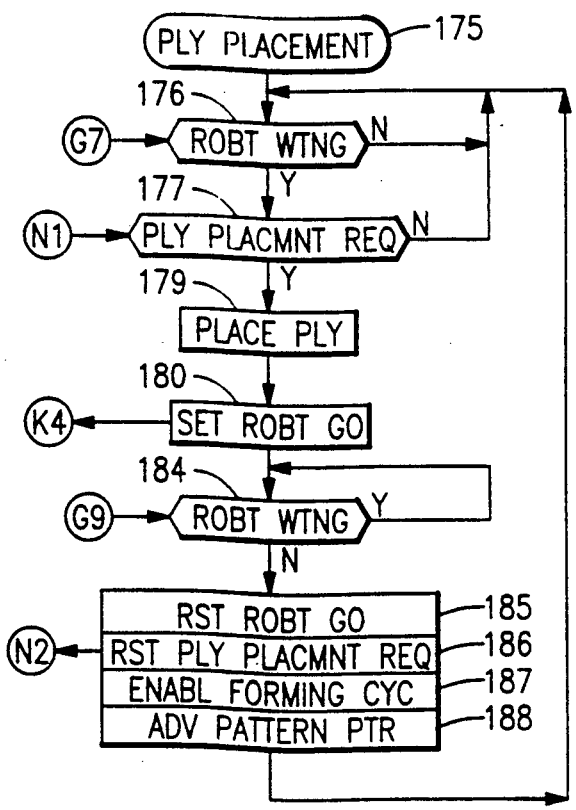

As part of initializing the main program within the main controller at the subroutine 61 (FIG. 2) a totally independent ply placement routine within the main controller 55 is reached in FIG. 7 through an entry point 175. For the first ply, as the main program advances through the find ply, ply pick up and verify pick up subroutines of FIGS. 2, 4 and 6, and for all subsequent plies as the main program advances through the ply pick up and verify pick up subroutines of FIGS. 4 and 6, the ply placement subroutine of FIG. 7 sits at a test 176 waiting for an indication that the robot is waiting, and each time that it is, it will reach a test 177 to see if it's time to place the ply; and a negative result reverts the routine to test 176. Eventually it is ply placement time and a robot waiting signal, key G7, will come from a step 178 (FIG. 5) when the robot reaches the position over the mold where it can deposit the ply. At this point in time, since the robot is far to the right in FIG. 1, the vacuum activated inverter assembly 20 can be rotated 180° counterclockwise to pick up new plies for use in the next cycle of molding, if appropriate. On the other hand, if the remaining plies 24 (those still on the ply inverter assembly 20 in as shown in FIG. 1) are to be added to the mold, then the inverter assembly 20 need not be cycled at this time to acquire new plies.

With the robot waiting over the mold, the ply placement subroutine of FIG. 7 waits at the test 177 for the main program to tell it that it is time to place the ply on the mold. This comes from the step 168, (FIG. 6), which sends the ply placement request, key N1, to the test 177 (FIG. 7), an affirmative result of which will order the end effector 26 to place the ply, in a step 179. When the ply is placed on the mold, a step 180 orders the robot to move by setting robot go, key K4, which in FIG. 5 causes an affirmative result of a test 181 to reset robot waiting key G9, in a step 182, and command the robot in a step 114, to move to the hold position described hereinbefore. The reset of robot waiting, in turn, will cause a test 184, FIG. 7, to reset robot go in a step 185 and reset the ply placement request, key N2, in a step 186. Then, the robot controller program of FIG. 5 reverts to the steps 115, 116 to reaffirm that the robot is running and, once it reaches the hold position, to indicate that it is waiting for the next cycle. When the step 116 sets robot waiting, key G1, an affirmative result of test 84, FIG. 2, reaches the test 85 to determine that the placement request has been reset. The ending of the ply placement subroutine of FIG. 7 for one ply therefore signals the beginning of the ply pick up subroutine of FIG. 4 for the next ply. Next, in FIG. 7, a step 187 will indicate that a forming cycle could be performed, if desired at this time; in the general case, a forming cycle will not be performed because many plies are normally put in place prior to initiating a forming cycle. The forming cycle is not part of the present invention and not described herein; it is described in commonly owned U.S. Pat. No. 5,183,670. A step 188 will advance a pattern pointer to point to the pattern of the next sequence, which has already been read at steps 63 and 64 of FIG. 2. However, since the sequence indicated in step 64 is utilized to find the next ply, it is always saved for placement of the ply, and the ply placement routine does not advance from the pattern of one sequence to the next until it reaches the step 188. For the very first ply, the initialization of the main controller causes the pattern pointer to be advanced, so that the very first ply will be placed in accordance with the pattern established for it. This is possible because the robot has previously been ordered (step 180, FIG. 7) to go to the hold position so as to get it out of the way of the mold.

Many details described hereinbefore can be altered or eliminated in any implementation of the invention. For instance, the second try feature could be used without the parallel processing feature, and vice versa. The success signal could be used alone from an affirmative result of test 78 or test 155, and the done signal could be used alone as a failure signal from a negative result of those test.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A system for manufacturing composite articles from a plurality of plies, comprising:
    a source of plies to be laid up;
    a mold on which the plies are to be laid up in order to form a composite article;
    a vision subsystem including
        at least one video camera for providing image signals of an area of said source containing a ply to be laid up into said mold to form the composite article being made, and
        first signal processing means interconnected with said at least one video camera and responsive to coordinate signals provided thereto indicative of the expected position of the ply to be laid up for initiating a subroutine to process said image signals to provide alignment signals indicative of the actual position of the ply to be laid up; a robot subsystem including
    a robot movable in a plurality of axes and operable to pickup and release the ply to be laid up in response to command signals provided thereto, and
    second signal processing means interconnected with said first signal processing means and said robot and responsive to robot go signals provided thereto to order said robot to move to selected positions, and to provide robot waiting signals indicating that said robot has reached one of said selected positions; and third signal processing means interconnected with said first signal processing means and with said second signal processing means for providing a run vision signal to cause said first signal processing means to respond to said coordinate signals and said image signals from said at least one video camera to generate said alignment signals indicative of the actual position of the ply to be laid up and to alternatively provide a success signal indicating that the actual position of the ply to be laid up has been determined and to provide a done signal without providing said success signal if said first signal processing means is unable to determine the actual position of the ply to be laid up;

said third signal processing means being further operative in response to said success signal to provide signals causing said robot subsystem to request said alignment signals and to move to the ply to be laid up, to pick up the ply to be laid up and to move the ply to be laid up to said mold and release the ply;

said third signal processing means being further operative in response to said done signal in the absence of said success signal to provide said run vision signal and a second try signal to reinitiate said vision subsystem subroutine to determine the actual location of the ply to be laid up;

said third signal processing means being further operative in response to said done signal in the absence of said success signal and in the presence of said second try signal to provide signals to cause said vision subsystem to shut down and assume a quiescent state.

2. A system for manufacturing composite articles from a plurality of plies, comprising:

a source of plies to be laid up;

a mold on which the plies are to be laid up in order to form a composite article;

a vision subsystem including
  at least one video camera for providing image signals of an area of said source containing a ply to be laid up into said mold to form the composite article being made, and
  first signal processing means interconnected with said at least one video camera and responsive to coordinate signals provided thereto indicative of the ply to be laid up for initiating a subroutine to process said image signals to provide alignment signals indicative of the actual position of the ply to be laid up; a robot subsystem including
  a robot movable in a plurality of axes and operable to pick up and release the ply to be laid up in response to command signals provided thereto, and
  second signal processing means interconnected with said robot and said first signal processing means and responsive to robot go signals provided thereto to order said robot to move to selected positions, and to provide robot waiting signals indicating that said robot has reached one of said selected positions; and third signal processing means interconnected with said first signal processing means and with said second signal processing means for providing a run vision signal to said vision subsystem causing said first signal processing means to respond to said coordinate signals and said image signals from said at least one video camera to generate said alignment signals indicative of the actual position of the ply to be laid up;

said third signal processing means being further operative to cause said robot subsystem to request said alignment signals, to move to the ply to be laid up, to pick up the ply to be laid up, and to move the ply to be laid up to said mold;

said third signal processing means being further operative to provide said run vision signal and a vision verify signal to cause said first signal processing means to respond to said image signals from said at least one video camera to provide a success signal in the event that said image signals verify that the ply to be laid up is missing from said source and to otherwise provide a done signal without providing said success signal;

said third signal processing means being further operative in response to said success signal to provide signals to said robot subsystem to cause said robot to release the ply to be laid up at said mold;

said third signal processing means being further operative in response to said done signal in the absence of said success signal to provide said run vision signal, said vision verify signal, and a second try signal to reinitiate said vision subsystem subroutine to determine the actual location of the ply to be laid up;

said third signal processing means being further operative in response to said done signal in the absence of said success signal and in the presence of said second try signal to provide signals to cause said vision and robot subsystems to shut down and assume a quiescent state.

3. A system for manufacturing composite articles from a plurality of plies, comprising:

a source of plies to be laid up;

a mold on which the plies are to be laid up in order to form a composite article;

a vision subsystem including
  at least one video camera for providing image signals of an area of said source containing a ply to be laid up into said mold to form the article being made, and
  first signal processing means interconnected with said at least one video camera and responsive to coordinate signals provided thereto indicative of the expected position of the ply to be laid up for initiating a subroutine to process said image signals to provide alignment signals indicative of the actual position of the ply to be laid up; a robot subsystem including
  a robot movable in a plurality of axes and operable to pick up and release the ply to be laid up in response to command signals provided thereto, and
  second signal processing means interconnected with said robot and said first signal processing means and responsive to robot go signals provided thereto to order said robot to move to selected positions, and to provide signals indicating that said robot has reached one of said selected positions; and third signal processing means interconnected with said first signal processing means and said second signal processing means for providing a run vision signal to cause said first signal processing means to respond to said coordinate signals and said image signals from said at least one video camera to generate said alignment signals indicative of the actual position of the ply to be laid up;

said third signal processing means being further operative to cause said robot subsystem to request said alignment signals, to move to the ply to be laid up, to pick up the ply to be laid up, and to move the ply to be laid up to said mold;

said third signal processing means being further operative to provide said run vision signal and a vision verify signal to cause said first signal processing means to respond to said image signals to provide a success signal in the event that said image signals verify that the ply to be laid up is missing from said source;

said third signal processing means being further operative in response to said success signal to provide signals to said robot subsystem to cause said robot to release the ply to be laid up at said mold, and concurrently providing said run vision signal to said vision subsystem to cause said first signal processing means to respond to said coordinate signals and said image signals relating to a next ply to be laid up to generate new alignment signals indicative of the actual position thereof whereby the placing of the ply to be laid up on said mold is overlapped with the locating of the next ply to be laid up.

* * * * *